Currier & Simpson.
Barometer.
Nº 26,969.         Patented Jan. 31, 1860.
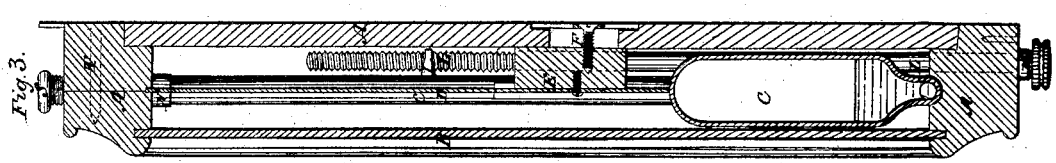
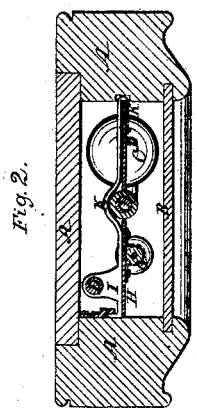
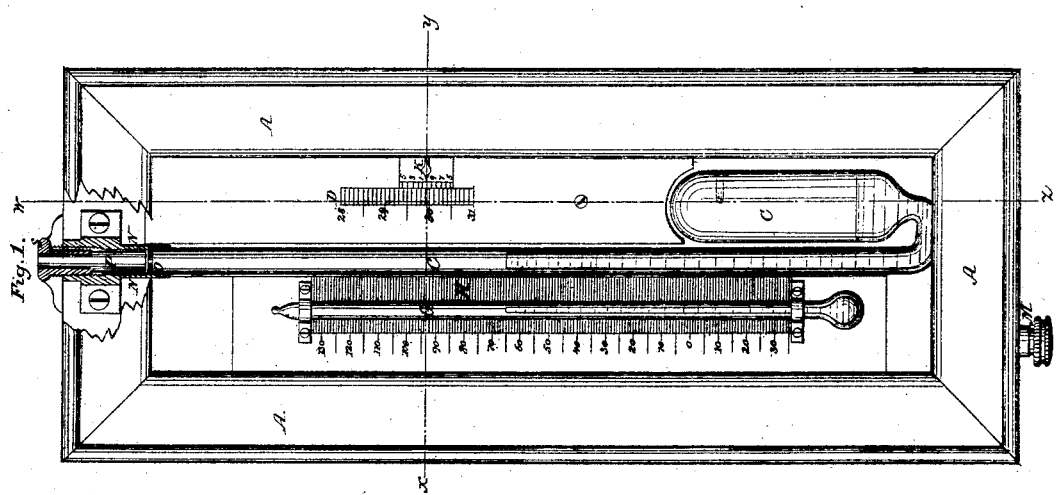
Witnesses.
Cyrus Latham.
William H. Vanumm.
Inventor.
Jacob B. Currier
Andrew J. Simpson

UNITED STATES PATENT OFFICE.

A. J. SIMPSON AND J. B. CURRIER, OF LOWELL, MASSACHUSETTS.

ARRANGEMENT OF AIR AND MERCURIAL THERMOMETERS.

Specification of Letters Patent No. 26,969, dated January 31, 1860.

*To all whom it may concern:*

Be it known that we, ANDREW J. SIMPSON and JACOB B. CURRIER, both of Lowell, in the county of Middlesex, and commonwealth of Massachusetts, have invented a new and useful instrument which we call the Portable Union-Barometer; and we do hereby declare that the following is a full, clear, and exact description thereof.

The object of this invention is to ascertain from time to time, the changes in the pressure of the atmosphere, and also to measure its total pressure, by a portable apparatus that shall be considerably smaller than the ordinary mercurial barometer. For this purpose, we combine an ordinary hermetically sealed mercurial thermometer, with a barometric or air thermometer, the tube of which being open at the top, and extending downwards, is recurved at its bottom, and has its shortest limb enlarged into an elongated upright bulb. This bulb is nearly filled with air, the lower part of it, and its subjoined tube being filled with mercury. These two thermometers are placed side by side, and so constructed, that so long as the pressure of the atmosphere remains the same, the tops of the two columns of mercury rise by the increase and fall by the decrease in the temperature of the atmosphere exactly the same distance. For instance if in a temperature of 60 degrees the tops of the two mercurial columns stand level; now suppose the temperature to increase, to 80 degrees the two columns would rise alike, and then stand level, as before, and thus the two columns would remain level through all ordinary changes of temperature, and in this condition we call them of an equal range. Now the barometric thermometer being open at the top, is also subject to variation by a change of the pressure of the atmosphere, the mercury in the tube being depressed by an increase and rising by a decrease of pressure. And it will be seen that if after adjusting the tops of the two columns level—means for which are provided—there should occur a difference in the levels it will be owing only to the change in the pressure of the atmosphere.

The adjustment of the thermometers, we accomplish by fastening the barometric thermometer firmly to the case, and connecting the sealed thermometer with a screw by which it can be raised or lowered at pleasure.

Attached to, and proceeding from the sealed thermometer is a pointer directed to a scale fastened to the case of the instrument. This scale is marked so that its divisions will correspond with those of the ordinary mercurial barometer, and is capable of being adjusted to any standard barometer by means of a set screw on the back-side of the instrument.

In constructing the instrument we ascertain the length of the divisions of this barometric scale and the position of the pointer, by submitting the apparatus to an artificial gaged pressure and mark the divisions and set the pointer accordingly. Another method that we use for ascertaining the indications of the instrument is by fastening the scale upon the adjustable sealed thermometer and the pointer to the case of the instrument. On making an observation move the instrument up and down upon its fastening a few times to free the mercury from the capillary attraction of the tube, then adjust the top of the two columns of mercury level by means of the thumb-screw at the bottom of the instrument, then the pointer to the right of the instrument will stand upon the indication corresponding to the height of mercury in inches sustained by the pressure of the atmosphere at the time, in the common mercurial barometer; if after adjusting the instrument as above there should occur a change in the level of the mercuries, the column in the large tube rising above the other, it will be on account of less pressure in the atmosphere; if on the other hand, it falls the pressure has increased.

In ascertaining the pressure of the atmosphere by the ordinary mercurial barometer, it is necessary to make a correction for the expansion of its mercury by change of temperature. From the fact that the readings of our instrument are derived from a variation in the two thermometers, it will be seen that such a correction will not be necessary. It will also be seen, that as the reading of the barometer is controlled by the variation in the levels of the two mercurial columns which are equal or identical in their movements from temperature—that a scale of temperature may be used or dispensed with at pleasure.

To make the apparatus portable, it is provided with means of closing the top of the open tubed barometric thermometer so that it can be closed sufficiently to permit air to escape, and yet retain the mercury; also to hermetically shut it. This we accomplish by providing a socket shutting over the end of the open tube, within the socket and on the end of the glass tube, we place an elastic packing which is controlled by a screw and plunger. When the plunger is screwed down carefully it can be adjusted so that air will escape and the mercury be retained, in this condition the instrument can be gently tipped and the mercury will run to the top of the glass tube and thus completely expel the air; then the plunger can be firmly screwed down upon the packing, and the tube will be hermetically sealed. As long as it remains thus stopped, it can be carried in any position, and when required for use, the plunger can be raised, and it will be in its working condition again, before releasing the screw however it is necessary that the tube is filled with mercury.

A construction and arrangement of our invention is shown by reference to the drawings as follows, viz:

Figure 1, is a front view. Fig. 2 is a cross section through H, Y. Fig. 3 is a vertical section through W, Z.

Similar letters of reference in each of the several figures refer to like parts.

A, is a case made of wood to receive and protect the several parts of the instrument. A glass plate B, forms the front of the case.

C is the barometric thermometer which is supported in the case at each end.

D is the adjustable scale plate of the barometric indications. It is fastened to a block E, and is adjustable by means of the set screw F passing through a slot in the back of the case.

G is the sealed thermometer furnished with a scale plate H, in the ordinary manner. To the back of this plate is fastened a nut I and pointer K, the pointer extending behind the barometric scale-plate and bending around it, so as to point to the scale marked upon its face. The pointer may be furnished with a vernier by which the scale can be read more correctly. From the nut I, passes a set screw L and projects through the bottom of the case where it is provided with a thumb head M, by which it may be turned and thus moving the sealed thermometer up or down, adjust the tops of the two colums of mercury level.

N, is a metallic socket for receiving and holding the end of the open tube. Within the socket and upon the end of the tube, is an elastic packing O. Through the center of this packing is a small hole to admit the air.

P, is a plunger operated by a thumb screw S, on the outside of the case and is intended to be screwed down upon the packing, for the purpose of closing the end of the tube, and thus rendering the instrument portable.

T, T, are screws entering through the back of the case to hold the cap molding that retains the glass face.

In this drawing the barometric scale is about one and a half inches, for three inches of the ordinary mercurial barometer but in the instrument about fifteen inches long—which is the size we have adopted for use—we find the scale to be nearly inch for inch.

Having thus fully described our invention, what we claim as new and desire to secure by Letters Patent is—

1. We claim the combination of the sealed thermometer and the barometric thermometer when both have the same range from temperature for determining the pressure of the atmosphere substantially as herein described.

2. We claim the method of adjusting the two thermometers so that a change in the weight of the atmosphere will be indicated by their variation.

In witness whereof we have hereunto set our signatures this 21st day of Dec. A. D. 1859.

ANDREW J. SIMPSON.
JACOB B. CURRIER.

In presence of—
W. V. GARDNER,
A. J. STACKPOLE.